United States Patent
Yoneji (10) Patent No.: US 12,266,080 B2
(45) Date of Patent: Apr. 1, 2025

(54) IMAGE PROCESSING DEVICE, IMAGE PROCESSING METHOD, IMAGE PROCESSING PROGRAM, AND IMAGE PROCESSING SYSTEM FOR GENERATING HIGH-RESOLUTION IMAGES WITH REFLECTED LIGHT IMAGES AND BACKGROUND LIGHT IMAGES

(71) Applicant: DENSO CORPORATION, Kariya (JP)

(72) Inventor: Kenichi Yoneji, Kariya (JP)

(73) Assignee: DENSO CORPORATION, Kariya (JP)

( * ) Notice: Subject to any disclaimer, the term of this patent is extended or adjusted under 35 U.S.C. 154(b) by 403 days.

(21) Appl. No.: 17/660,582

(22) Filed: Apr. 25, 2022

(65) Prior Publication Data

US 2022/0245766 A1    Aug. 4, 2022

Related U.S. Application Data

(63) Continuation of application No. PCT/JP2020/033069, filed on Sep. 1, 2020.

(30) Foreign Application Priority Data

Oct. 28, 2019 (JP) ................................. 2019-195549

(51) Int. Cl.
*G06T 3/40* (2024.01)
*G01S 7/4865* (2020.01)
(Continued)

(52) U.S. Cl.
CPC .......... *G06T 3/4076* (2013.01); *G01S 7/4865* (2013.01); *G01S 17/894* (2020.01);
(Continued)

(58) Field of Classification Search
None
See application file for complete search history.

(56) References Cited

U.S. PATENT DOCUMENTS

2017/0350983 A1   12/2017  Hall et al.
2019/0369257 A1   12/2019  Hall et al.
(Continued)

FOREIGN PATENT DOCUMENTS

JP    2010114474 A  *  5/2010  ............... G06T 7/20
JP    2021-067649 A    4/2021
(Continued)

OTHER PUBLICATIONS

English translation of JP-2010114474-A (Abstract). (Year: 2010).*
English translation of WO-2021049490-A1. (Year: 2021).*
English translation of WO-2021049491-A1. (Year: 2021).*

*Primary Examiner* — Thomas D Lee
(74) *Attorney, Agent, or Firm* — Maschoff Brennan (57) ABSTRACT

An image processing device includes an image acquiring unit, a matching processing unit, and a super-resolution processing unit. The image acquiring unit is configured to acquire a reflected light image and a background light image in association with each other. The matching processing unit is configured to a plurality of first images, each of which is one of the reflected light image and the background light image, and perform a sub-pixel matching process on the plurality of first images. The super-resolution processing unit is configured to perform a super-resolution process on a plurality of second images, each of which is the other one of the reflected light image and the background light image, using alignment information acquired by the sub-pixel matching process to generate a high-resolution image.

13 Claims, 5 Drawing Sheets

(51) Int. Cl.
  *G01S 17/894* (2020.01)
  *G01S 17/931* (2020.01)
  *G06T 3/4076* (2024.01)
  *G06T 7/20* (2017.01)
  *G06T 7/30* (2017.01)

(52) U.S. Cl.
  CPC .............. *G01S 17/931* (2020.01); *G06T 7/20* (2013.01); *G06T 7/30* (2017.01); *G06T 2207/30252* (2013.01)

(56) References Cited

U.S. PATENT DOCUMENTS

| | | |
|---|---|---|
| 2019/0369258 A1 | 12/2019 | Hall et al. |
| 2020/0142070 A1 | 5/2020 | Hall et al. |
| 2020/0233089 A1 | 7/2020 | Hall et al. |
| 2020/0319343 A1 | 10/2020 | Hall et al. |

FOREIGN PATENT DOCUMENTS

| | | | | |
|---|---|---|---|---|
| WO | WO-2021049490 A1 * | 3/2021 | ............ | G06T 7/194 |
| WO | WO-2021049491 A1 * | 3/2021 | ............ | G01S 17/08 |

* cited by examiner

IMAGE PROCESSING DEVICE, IMAGE PROCESSING METHOD, IMAGE PROCESSING PROGRAM, AND IMAGE PROCESSING SYSTEM FOR GENERATING HIGH-RESOLUTION IMAGES WITH REFLECTED LIGHT IMAGES AND BACKGROUND LIGHT IMAGES

CROSS REFERENCE TO RELATED APPLICATION

The present application is a continuation application of International Patent Application No. PCT/JP2020/033069 filed on Sep. 1, 2020, which designated the U.S. and claims the benefit of priority from Japanese Patent Application No. 2019-195549 filed on Oct. 28, 2019. The entire disclosures of all of the above applications are incorporated herein by reference.

TECHNICAL FIELD

The present disclosure relates to an image processing technique.

BACKGROUND

A general LiDAR (Light Detection and Ranging) is a kind of distance sensor configured to measure a distance. The LiDAR is configured to measure the distance to an object in a vicinity by scanning light using a scanning mirror and detecting the light reflected from the object.

SUMMARY

According to a first aspect of the present disclosure, an image processing device includes an image acquiring unit, a matching processing unit, and a super-resolution processing unit. The image acquiring unit is configured to acquire a reflected light image and a background light image in association with each other, the reflected light image containing distance information obtained by emitting light and detecting the light reflected from an object by a light receiving element, the background light image containing luminance information obtained by detecting background light relative to the light reflected from the object by the light receiving element. The matching processing unit is configured to prepare a plurality of first images, each of the plurality of first images being one of the reflected light image and the background light image, and perform a sub-pixel matching process on the plurality of first images. The super-resolution processing unit is configured to prepare a plurality of second images, each of the plurality of second images being the other one of the reflected light image and the background light image and being associated with the each of the plurality of first images, and perform a super-resolution process on the plurality of second images using alignment information acquired by the sub-pixel matching process to generate a high-resolution image.

According to a second aspect of the present disclosure, an image processing method includes acquiring a reflected light image and a background light image in association with each other, the reflected light image containing distance information obtained by emitting light and detecting the light reflected from an object by a light receiving element, the background light image containing luminance information obtained by detecting background light relative to the light reflected from the object by the light receiving element. The image processing method includes performing a sub-pixel matching process on a plurality of first images, each of the plurality of first images being one of the reflected light image and the background light image. The image processing method includes performing a super-resolution process on a plurality of second images using alignment information acquired by the sub-pixel matching process to generate a high-resolution image, each of the plurality of second images being the other one of the reflected light image and the background image and being associated with the each of the plurality of first images.

According to a third aspect of the present disclosure, a computer program product includes instruction configured to, when executed by at least one processor, cause the at least one processor to acquire a reflected light image and a background light image in association with each other, the reflected light image containing distance information obtained by emitting light and detecting the light reflected from an object by a light receiving element, the background light image containing luminance information obtained by detecting background light relative to the light reflected from the object by the light receiving element. The instruction is configured to, when executed by at least one processor, cause the at least one processor to perform a sub-pixel matching process on a plurality of first images, each of the plurality of first images being one of the reflected light image and the background light image. The instruction is configured to, when executed by at least one processor, cause the at least one processor to perform a super-resolution process on a plurality of second images using alignment information acquired by the sub-pixel matching process to generate a high-resolution image, each of the plurality of second images being the other one of the reflected light image and the background image and being associated with the each of the plurality of first images.

According to a fourth aspect of the present disclosure, an image processing system includes a distance sensor, a matching processing unit, and a super-resolution processing unit. The distance sensor is configured to generate a reflected light image containing distance information obtained by emitting light and detecting the light reflected from an object by a light receiving element, and a background light image containing luminance information obtained by detecting background light relative to the light reflected from the object by the light receiving element. The matching processing unit is configured to prepare a plurality of first images, each of the plurality of first images being one of the reflected light image and the background light image, and perform a sub-pixel matching process on the plurality of first images. The super-resolution processing unit is configured to prepare a plurality of second images, each of the plurality of second images being the other one of the reflected light image and the background light image and being associated with the each of the plurality of first images, and perform a super-resolution process on the plurality of second images using alignment information acquired by the sub-pixel matching process to generate a high-resolution image.

EMBODIMENTS

In the distance sensor, it may be advantageous that the gaps between the sensing points are small for acquiring dense data. However, in the scanning type LiDAR, it may be difficult to narrow the gaps between the sensing points particularly in a direction perpendicular to a scanning direction due to the arrangement of the light receiving element, for example. As a result, only low-density, low-resolution detection data can be acquired.

Figure 1:
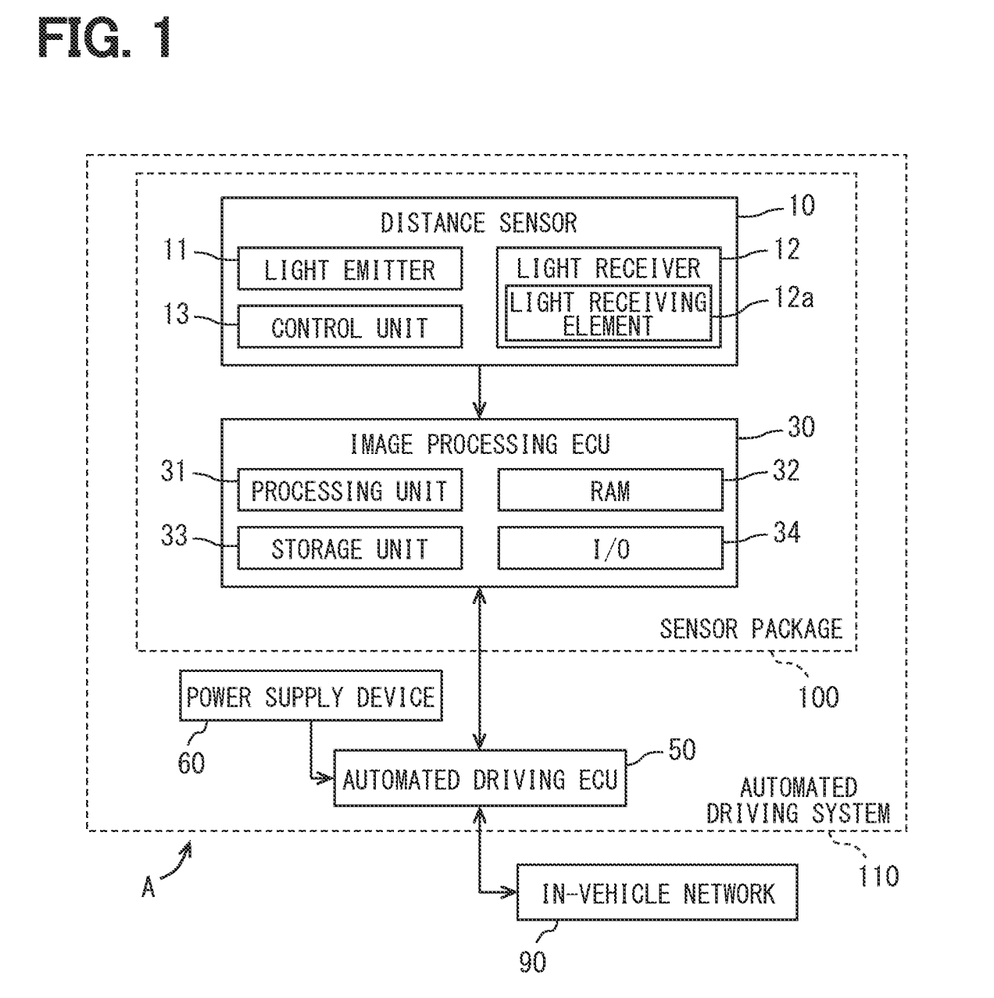
FIG. 1 is a diagram illustrating a sensor package and an automated driving system according to an embodiment of the present disclosure.
Figure 2:
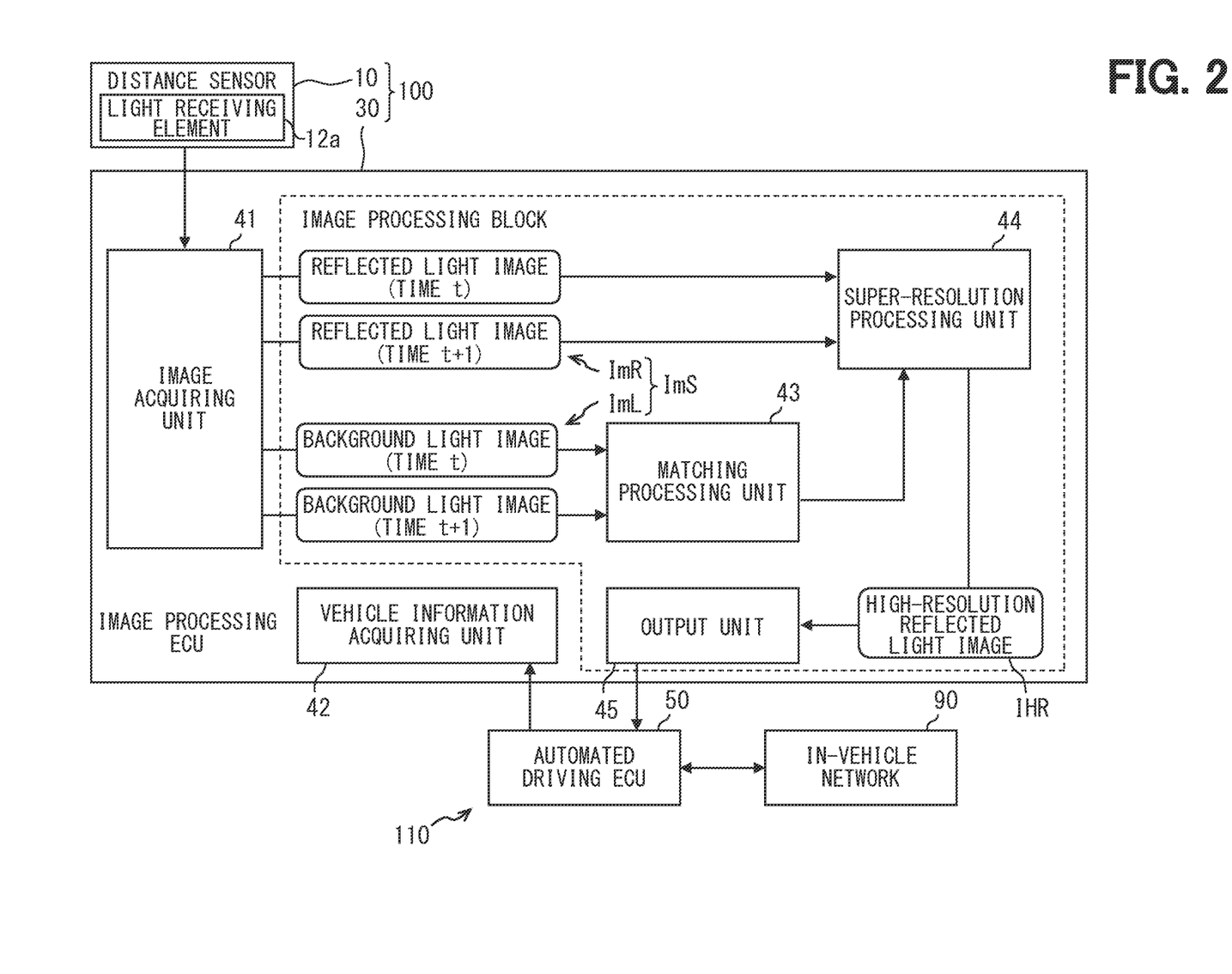
FIG. 2 is a block diagram for explaining an image processing process in an image processing ECU.

An image processing ECU (Electronic Control Unit) 30 of an embodiment of the present disclosure shown in FIG. 1 is used in a vehicle A that is an moving body. As shown in FIGS. 1, 2, the image processing ECU 30 constitutes a sensor package 100 together with an autonomous sensor such as a distance sensor 10. The sensor package 100 may constitute an automated driving system 110 together with the automated driving ECU 50 and a power supply device 60, for example.

The automated driving system 110 is, for example, a system package that realizes autonomous driving of the vehicle A without a driver. The automated driving ECU 50, which is a main component of the automated driving system 110, is a high-speed computing device mainly including a computer equipped with a processor, a random access memory (RAM), a storage unit, an input/output interface, and a bus connecting these elements.

The automated driving ECU 50 is configured to recognize the traveling environment around the vehicle A based on the information provided by the sensor package 100. The automated driving ECU 50 is further configured to grasp the traveling state of the vehicle A based on the vehicle information acquired from an in-vehicle network 90. The automated driving ECU 50 is configured to refer to the provided information and the vehicle information, and generate a future traveling path. The automated driving ECU 50 is configured to cooperate with the traveling system ECU of the vehicle A to automatically drive the vehicle A along the traveling path. The automated driving system 110 may be configured to provide an advanced driving assistance function to assist the driver instead of the fully automated driving function for the driverless driving.

In the automated driving system 110, the image processing ECU 30 is configured to process, as an image processing device, a sensor image ImS output from the distance sensor 10. The sensor package 100 including the image processing ECU 30 has a function of an image processing system. Hereinafter, the distance sensor 10 and the image processing ECU 30 of the sensor package 100 will be described.

The distance sensor 10 is a SPAD (Single Photon Avalanche Diode) LiDAR, for example. The distance sensor 10 is disposed at a front end or on a roof of the vehicle A that is a moving body to move together with the vehicle A. The measurement range of the distance sensor 10 includes at least the front range among the vicinity of the vehicle A, for example.

The distance sensor 10 includes a light emitter 11, a light receiver 12, a control unit 13, and the like. The light emitter 11 emits a light beam from a light source toward the measurement range by scanning the measurement range using a movable optical member such as a polygon mirror. For example, the light source may be a semiconductor laser such as a laser diode. The light source emits, according to an electric signal provided by the control unit 13, the light beam of invisible range (e.g. near infrared region) in a pulsed form. The light beam of invisible range is invisible to occupants in the vehicle and other people outside of the vehicle.

The light receiver 12 includes a condenser lens and the light receiving element 12a. The condenser lens gathers the reflected light of the light beam reflected by an object in the measurement range and the background light relative to the reflected light, and controls the gathered light to enter the light receiving element 12a. The light receiving element 12a is an element configured to convert the light into an electric signal by photoelectric conversion. The light receiving element 12a is provided by a CMOS sensor that has a high sensitivity in the near infrared region compared with the visible region for efficiently detecting the reflected light of the light beam. The sensitivity of the light receiving element 12a to each wavelength range may be adjusted by an optical filter. The light receiving element 12a has multiple light receiving pixels arranged as an array in one-dimensional direction or two-dimensional directions. Each light receiving pixel has a configuration using SPAD, and amplifies the electrons generated by the incident of photons by avalanche multiplication, thereby enabling highly sensitive photodetection.

The control unit 13 controls operations of the light emitter 11 and the light receiver 12. The control unit 13 is disposed on the same substrate as the light receiving element 12a, for example. The control unit 13 is mainly composed of a processor in a broad sense such as a microcontroller or an FPGA (Field-Programmable Gate Array). The control unit 13 has a scanning control function, a reflected light measuring function, and a background light measuring function.

The scanning control function is a function for controlling scanning of light beam by the light emitter 11. The control unit 13 oscillates the light beam emitted from the light source multiple times to have a pulse shape based on an operating clock of a clock oscillator included in the distance sensor 10. The control unit 13 is configured to operate the movable optical member in synchronization with the emission of the light beam.

The reflected light measuring function is a function of reading out, according to the scan timing of the light beam, a voltage value corresponding to the reflected light received by each light receiving pixel, and measuring an intensity of the reflected light. The control unit 13 is configured to sense the arrival time of the reflected light based on the timing when a peak appears in the output pulse of the light receiving element 12a. The control unit 13 is configured to measure the flight time of the light (Time of Flight) by measuring the time difference between the time when the light beam is emitted from the light source and the time when the reflected light arrives.

By the cooperation of the above scanning control function and the reflected light measuring function, the reflected light image ImR, which is image-like data, is generated. The control unit 13 measures the reflected light by the rolling shutter method to generate the reflected light image ImR. Specifically, the control unit 13 generates, according to the scanning of the light beam in a horizontal direction, information of pixel group aligned in a transverse direction on an imaging plane corresponding to the measurement range, one or more lines at a time. The control unit 13 generates one reflected light image ImR by longitudinally synthesizing the sequentially generated information of pixel group.

The reflected light image ImR is an image data containing distance information acquired by detecting (sensing) the reflected light of the light emitted from the light emitter 11 by the light receiving element 12a. The value indicating the flight time of the light is contained in each pixel of the reflected light image ImR. The value indicating the flight time of the light is a distance value indicating a distance from the distance sensor 10 to a reflection point of an object in the measurement range. The value indicating the intensity of the reflected light is contained in each pixel of the reflected light image ImR. That is, the reflected light image ImR is an image data representing a luminance distribution of the reflected light.

The background light measurement function is a function of reading out a voltage value corresponding to the background light received by each light receiving pixel at a time point immediately before measuring the reflected light, and measuring the intensity of the background light. Here, the background light is incident light entering the light receiving element 12a from the measurement range among the external area, and does not include the reflected light. The incident light includes natural light, light from an external display, and the like. Similar to the reflected light image ImR, the control unit 13 measures the background light by the rolling shutter method and generates the background light image ImL. The background light image ImL is an image data representing the luminance distribution of the background light before emitting the light, and contains the luminance information of the background light detected by the light receiving element 12a. That is, the value of each pixel arranged tow-dimensionally in the background light image ImL is a luminance value indicating the intensity of the background light at the corresponding portion of the measurement range.

The reflected light image ImR and the background light image ImL are sensed by the same light receiving element 12a, and acquired from the same optical system including the light receiving element 12a. Therefore, the coordinate system of the reflected light image ImR can be regarded as the same and coincident coordinate system as the coordinate system of the background light image ImL. Furthermore, there is almost no difference between the measurement time of the reflected light image ImR and the measurement time of the background light image ImL. For example, the time difference may be less than 1 nanosecond. Therefore, a set of successively acquired reflected light image ImR and background light image ImL can be regarded as being synchronized. In addition, the pixels of the reflected light image ImR and the background light image ImL can uniquely correspond to each other. The reflected light image ImR and the background light image ImL are successively output to the image processing ECU 30 as image data in which three data channels including the intensity of the reflected light, the distance to the object, and the intensity of the background light are stored for each pixel. The reflected light image ImR and the background light image ImL associated with each other may be referred to as a sensor image ImS.

The image processing ECU 30 is an electronic control unit mainly includes a computing circuit equipped with a processing unit 31, a RAM 32, a storage unit 33, an input/output interface 34, and a bus connecting these elements. The processing unit 31 is coupled with the RAM 32, and is provided by a hardware for executing an arithmetic processing. The processing unit 31 includes at least one calculation core, such as a central processing unit (CPU), a Graphical Processing Unit (GPU), and a FPGA. The processing unit 31 may be an image processing chip including an IP core or the like having another dedicated function. The image processing chip may be an ASIC (Application Specific Integrated Circuit) designed for the automated driving. The processing unit 31 executes, by accessing the RAM 32, various processes for functioning as the functional blocks described later. The storage unit 33 includes a non-volatile storage medium. The storage unit 33 stores various programs (image processing program, etc.) to be executed by the processing unit 31.

The image processing ECU 30 is configured to process the image information of the distance sensor 10 to generate, as an output image, a high-resolution image having a higher resolution than the image input from the distance sensor 10 using a so-called multi-frame super-resolution technique. The image processing ECU 30 is configured to execute the image processing program stored in the storage unit 33 by the processing unit 31 to have functional units such as an image acquiring unit 41, a vehicle information acquiring unit 42, a matching processing unit 43, a super-resolution processing unit 44, an output unit 45, and the like. In the functional units, the matching processing unit 43 and the super-resolution processing unit 44 are image processing blocks for performing the image processing.

The image acquiring unit 41 is configured to acquire the reflected light image ImR and the background light image ImL in association with each other from the distance sensor 10. The reflected light image ImR and the background light image ImL are image data based on the detection by the light receiving element 12a mounted in the vehicle A. The image acquiring unit 41 has a buffer function for the image data to store the image data for several frames of the reflected light image ImR and the background light image ImL. The image acquiring unit 41 is configured to provide the frames of the sensor images ImS required by the matching processing unit 43 and the super-resolution processing unit 44. For example, the image acquiring unit 41 is configured to provide, to the matching processing unit 43 and the super-resolution processing unit 44, the previous (e.g. at the time t) reflected light image ImR and the background light image ImL in addition to the latest (e.g. at the time t+1) reflected light image ImR and the background light image ImL.

The vehicle information acquiring unit 42 is configured to acquire the vehicle information output to the in-vehicle network 90 through the automated driving ECU 50. The vehicle information acquiring unit 42 is configured to acquire the vehicle information identifying the moving state such as the traveling speed of the vehicle A, for example. The vehicle information acquiring unit 42 successively provides the acquired vehicle information to the image acquiring unit 41, the matching processing unit 43, and the super-resolution processing unit 44 such that image processing suitable for the traveling state of the vehicle A is performed. The matching processing unit 43 shown in FIGS. 1-4 prepares several first images, each of which is one of the reflected light image ImR and the background light image ImL, and performs the sub-pixel matching process on the first images. The sub-pixel matching process is a process of associating frames with each other. In the present embodiment, the background light image ImL is the first image. The matching processing unit 43 generates alignment information for exactly matching the subject PO commonly captured in the background light images ImL when multiple frames of the background light images ImL (time t, t+1, t+2) that are successive in time series are superimposed.

Specifically, the matching processing unit 43 is configured to calculate a transformation amount (m) as the alignment information. The transformation amount (m) is a displacement amount for correcting the deviation when superimposing the images. The transformation amount (m) is given in a form generally called a homography matrix. The homography matrix is a 3×3 image transformation matrix to rotate, translation, and scaling the image. For example, when the background light image ImL for the time t is used as a reference, the matching processing unit 43 calculates two transformation amounts (m1), (m2) for matching the background light images ImL for the time t+1, t+2 to the background light image ImL for the time t (see FIG. 3).

Figure 3:
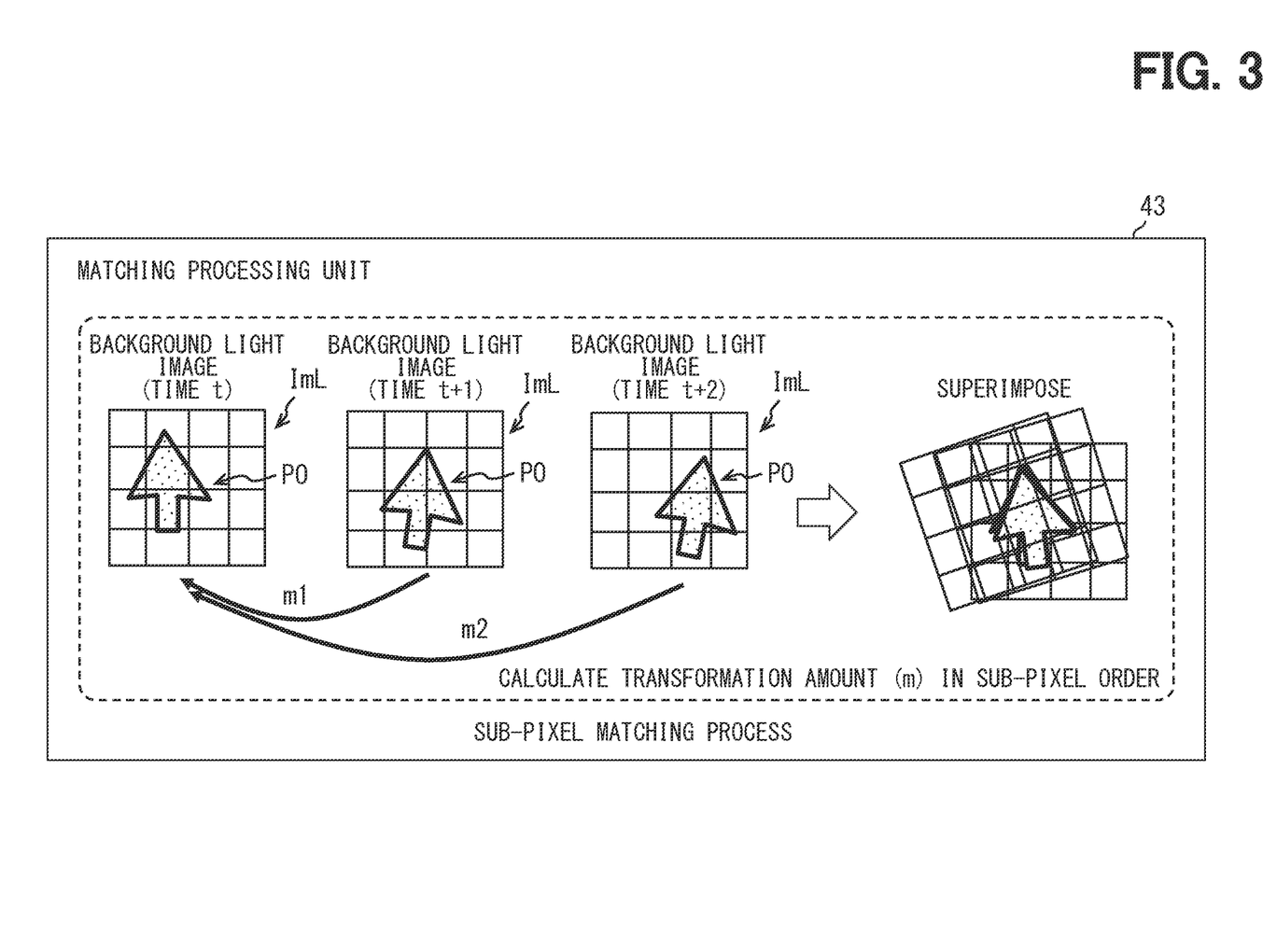
FIG. 3 is a diagram for explaining a sub-pixel matching process.

The matching processing unit 43 is configured to estimate the transformation amount (m) from the difference between luminance values of each pixel of the background light images ImL. The matching processing unit 43 is configured to calculate the transformation amount (integer value) in pixel units such that the sum of squares of the differences in the luminance values of each pixel is minimized using the block matching algorithm, for example. Subsequently, the matching processing unit 43 calculates the transformation amount with a decimal point accuracy smaller than the unit of one pixel of the background light image ImL using function approximation within the range premised on the integer value of the above transformation amount. The matching processing unit 43 acquires the transformation amount in the sub-pixel order using parabolic fitting, equi-angular straight line fitting, or the like.

Figure 4:
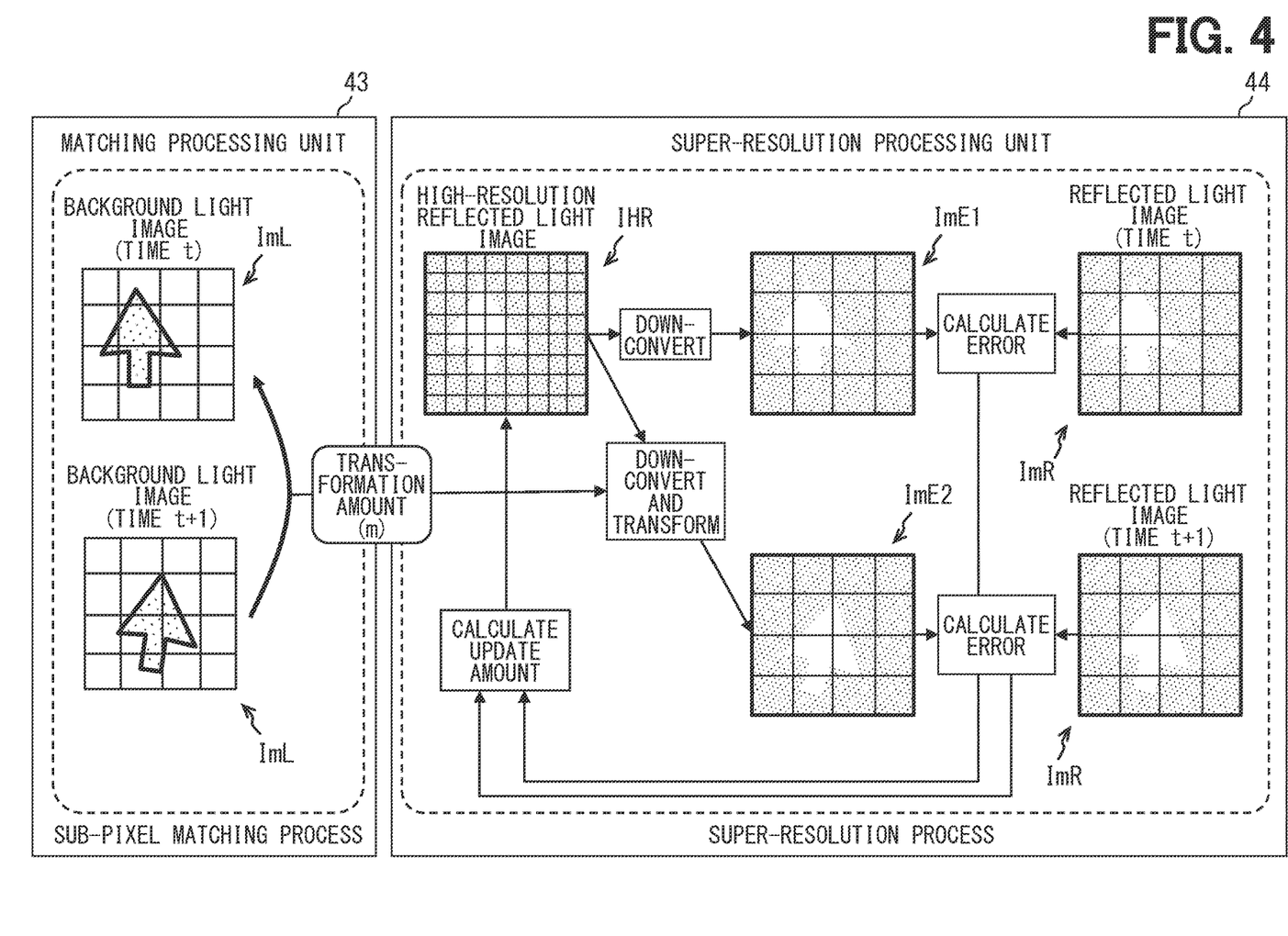
FIG. 4 is a diagram for explaining a super-resolution process.

The super-resolution processing unit 44 prepares several second images, each of which is the other one of the reflected light image ImR and the background light image ImL. Each second image is associated with one of the first images which are the subject of the sub-pixel matching process. In the present embodiment, the reflected light image ImR is the second image, and the reflected light image ImR captured at the same time as the background light image ImL which is the subject of the sub-pixel matching process is prepared. The super-resolution processing unit 44 is configured to generate a high-resolution image of the reflected light image ImR (hereinafter, referred to as a high-resolution reflected light image IHR) by performing the super-resolution process on the reflected light images ImR using the transformation amount (m) obtained by the sub-pixel matching process on the background light image ImL.

The super-resolution processing unit 44 is configured to perform the super-resolution process by the reconstruction algorithm. The super-resolution processing unit 44 upconverts the reflected light image ImR (time t) by the interpolation technique such as the bicubic interpolation to generate a provisional high-resolution reflected light image IHR. Subsequently, the super-resolution processing unit 44 generates a first comparative image ImE1 and a second comparative image ImE2 by down-converting the high-resolution reflected light image IHR to the same resolution as the reflected light image ImR by applying a function to the high-resolution reflected light image IHR.

The first comparative image ImE1 is an image to be compared with the reflected light image ImR captured at the time t. The first comparative image ImE1 is obtained by reducing the provisional high-resolution reflected light image IHR. The second comparative image ImE2 is an image to be compared with the reflected light image ImR captured at the time t+1. The second comparative image ImE2 is generated by reducing the high-resolution reflected light image IHR and applying the transformation amount (m) obtained by the sub-pixel matching process.

As described above, through the process for generating the comparative images ImE1, ImE2 from the provisional high-resolution reflected light image IHR, the process for capturing the subject PO by the light receiving element 12*a* is mathematically simulated. Accordingly, the function applied to the high-resolution reflected light image IHR includes a PSF (Point Spread Function) that reflects the blur that occurs in the reflected light image ImR captured by the distance sensor 10.

Specifically, the blur in the reflected light image ImR is related to the shape of the spread of the light beam emitted from the light emitter 11. When the spread of the light beam is large, the light to be detected by a specific pixel can be detected by pixels around the specific pixel, and the blur in the reflected light image ImR increases. On the contrary, when the spread of the light beam is small, the blur in the reflected light image ImR is reduced. In order to faithfully reflect these structural optical characteristics of the distance sensor 10 in the super-resolution process, the super-resolution processing unit 44 determines the PSF to be applied to the high-resolution reflected light image IHR using beam shape information that indicates the spread shape of the light beam. The beam shape information may be provided from the distance sensor 10 or read out from the storage unit 33.

The super-resolution processing unit 44 calculates the difference between the actual reflected light images ImR, and the first comparative image ImE1 and the second comparative image ImE2 which are mathematically generated. The super-resolution processing unit 44 calculates an update amount for updating the distance value of the provisional high-resolution reflected light image IHR to compensate for the difference between the images. The super-resolution processing unit 44 applies the calculated update amount to the high-resolution reflected light image IHR to bring the high-resolution reflected light image IHR closer to the correct state. The super-resolution processing unit 44 completes the high-resolution reflected light image IHR by repeating the difference calculation and the update of the high-resolution reflected light image IHR multiple times (several to dozens of times). The super-resolution processing unit 44 provides the generated high-resolution reflected light image IHR to the output unit 45.

The above-described super-resolution process can be performed by the calculation for minimizing the following formula 1.

$$C(f) = \sum_t t \| d\_spad(t) - D(g * f) \|^2 + \alpha \| E(f) \|^2 \quad \text{(Formula 1)}$$

In the above formula 1, 'f' represents the high-resolution reflected light image IHR being processed. 'g' represents the above-described PSF. 'D' represents a reducing transformation function based on the transformation amount acquired by the sub-pixel matching process. 'd_spad (t)' represents the distance value of the reflected light image ImR for the time t. 'E' represents the function for extracting edges in the image such as a Laplacian filter. The Laplacian filter performs a function of maintaining the distance value in planer portion in the image. 'α' is a constraint parameter.

The output unit 45 generates information to be provided to the automated driving ECU 50 using the high-resolution reflected light image IHR generated by the super-resolution processing unit 44. Specifically, the output unit 45 is configured to successively output, to the automated driving ECU 50, information identified from the high-resolution reflected light image IHR such as the distance to the subject PO and the size of the subject PO.

Further, the image acquiring unit 41, the matching processing unit 43, and the super-resolution processing unit 44 change the contents of the sub-pixel matching process and the super-resolution process based on the vehicle information (moving body information) indicating the moving state of the vehicle A. According to these control, the delay and the accuracy of the provided information output from the image processing ECU 30 are optimized for the traveling state of the vehicle A.

Specifically, when the traveling speed of the vehicle is above a threshold value, the matching processing unit 43 and the super-resolution processing unit 44 suspend the sub-pixel matching process and the super-resolution process. In this case, the latest reflected light image ImR is provided to the output unit 45 instead of the high-resolution reflected light image IHR. According to this, in a scene where the vehicle A is traveling at a high speed, the delay of the information provided to the automated driving ECU 50 can be minimized.

Further, the super-resolution processing unit 44 changes the number of iterations for the iterative operation of the super-resolution process based on the vehicle information. Specifically, the super-resolution processing unit 44 decreases the number of the iterations with the increase of the traveling speed of the vehicle A. As a result, the delay that occurs in the information provided to the automatic driving ECU 50 is gradually reduced as the traveling speed increases. On the contrary, the super-resolution processing unit 44 increases the number of iterations with the decrease of the traveling speed of the vehicle A. As a result, the accuracy of the provided information is gradually improved as the traveling speed decreases.

The matching processing unit 43 and the super-resolution processing unit 44 change the number of frames used for the sub-pixel matching process and the super-resolution process based on the vehicle information. Specifically, the number of frames of the image to be processed is reduced with the increase of the traveling speed of the vehicle A. As a result, the delay that occurs in the provided information is gradually reduced as the traveling speed increases. On the contrary, the number of frames of the image to be processed is increased with the decrease of the traveling speed of the vehicle A. As a result, the accuracy of the provided information is gradually improved as the traveling speed decreases.

Figure 5:
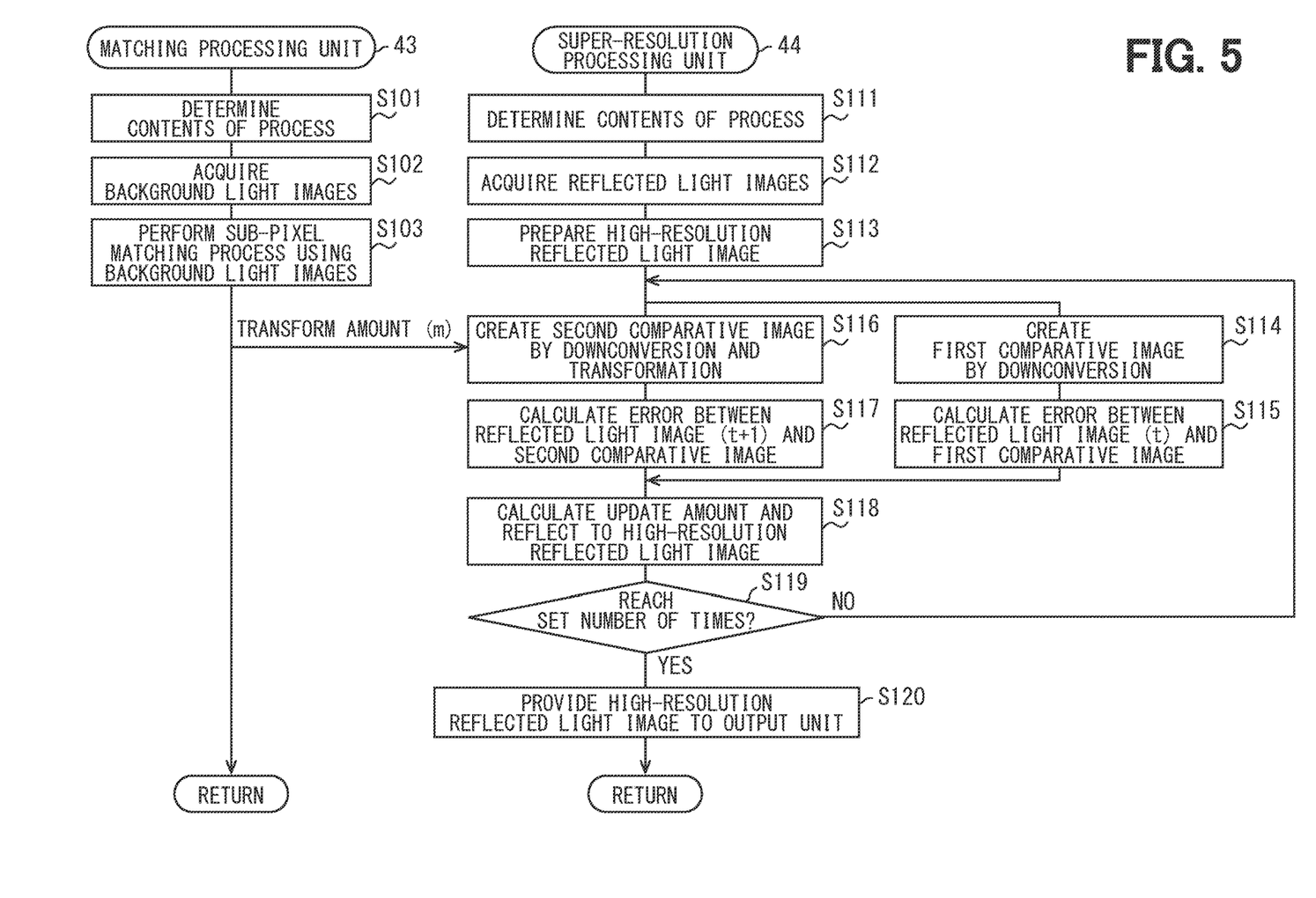
FIG. 5 is a flowchart of the image processing in the image processing ECU.

Next, the image processing method for realizing the sub-pixel matching process and the super-resolution process is described based on the flowchart shown in FIG. 5 with reference to FIGS. 1-4. The image processing shown in FIG. 5 is started after the automated driving system 110 is started and the image processing ECU 30 completed the initializing process. The image processing ECU 30 repeats each step of the flowchart shown in FIG. 5 until the automated driving system 110 is stopped. Among the steps shown in FIG. 5, S101-S103 are performed by the matching processing unit 43, and S111-S120 are performed by the super-resolution processing unit 44.

In S101, the matching processing unit 43 sets the contents of the sub-pixel matching process based on the vehicle information acquired by the vehicle information acquiring unit 42, and the process proceeds to S102. In S111, the super-resolution processing unit 44 sets the contents of the super-resolution process based on the vehicle information acquired by the vehicle information acquiring unit 42, and the process proceeds to S112.

The contents set in S101 and S111 are bound to each other to be the same contents. Specifically, in S101 and S111, whether the process is performed and the number of frames to be processed in the process are determined together. In S111, the number of iterations of the iterative operation in the super-resolution process is determined. When the sub-pixel matching process and the super-resolution process are determined not to be performed based on the vehicle information, the matching processing unit 43 and the super-resolution processing unit 44 repeat S101 and S111 respectively to standby the start of the process.

In S102, the matching processing unit 43 prepares the multiple frames of the background light image ImL in corporation with the image acquiring unit 41, and the process proceeds to S103. In S112, the super-resolution processing unit 44 prepares the multiple frames of the reflected light image ImR in corporation with the image acquiring unit 41, and the process proceeds to S113. In S102 and S112, the number of frames set in S101 and S111 of the background light image ImL and the reflected light image ImR captured in the same time are prepared.

In S103, the matching processing unit 43 performs the sub-pixel matching process on the background light images ImL to generate the transformation amount (m) according to the number of frames. The transformation amount (m) is a value based on the background light image ImL taken in the past time (e.g., at time t) among the multiple background light images ImL to be processed. The matching processing unit 43 provides, to the super-resolution processing unit 44 (see S116), the transformation amount (m) generated as the alignment information, and the process returns to S101.

In S113, the super-resolution processing unit 44 upconverts the reflected light image ImR for the same time (time t) as the background light image ImL used as the reference in the sub-pixel matching process. In S113, an initial high-resolution reflected light image IHR having a higher resolution than the input reflected light image ImR is prepared, and the process proceeds to S114 and S116. In S114, the first comparative image ImE1 is generated by down-converting the high-resolution reflected light image IHR, and the process proceeds to S115. For reducing process in S114, the beam shape information is used. In S115, the first comparative image ImE1 and the reflected light image ImR for the time t are compared with each other to calculate the difference between the distance values of these images, and the process proceeds to S118.

In S116 performed in parallel with S114, the second comparative image ImE2 is generated by down-converting the high-resolution reflected light image IHR, and the process proceeds to S117. In S116, the transformation process is performed in addition to the reducing process. For the transformation process in S116, the transformation amount (m) calculated in S103 is used. In S117, the second comparative image ImE2 and the reflected light image ImR for the time t+1 are compared with each other to calculate the difference between the distance values of these images, and the process proceeds to S118.

In S118, the update amount to be applied to the current high-resolution reflected light image IHR is calculated using the differences calculated in S115 and S117. In S118, the calculated update amount is reflected to the high-resolution reflected light image IHR, and the process proceeds to S119.

In S119, it is determined whether the number of iterations of the iterative operation has reached the predetermined number of times set in S111. When it is determined in S119 that the number of iterations of the iterative operation has not reached the set number of times, the process returns to S114 and S116 to update the high-resolution reflected light image IHR, and the process to increase the image quality is continued. In contrast, when it is determined in S119 that the number of repetitions of the iterative operation has reached the set number of times, the process proceeds to S120. In S120, the high-resolution reflected light image IHR to which the update amount was reflected in the immediately preceding S118 is provided to the output unit 45 as the output image of the super-resolution process, and the process returns to S111.

According to the above-described embodiment, the sub-pixel matching process is performed on one of the reflected light image ImR and the background light image ImL associated with each other to prepare the alignment information required for the super-resolution process. Then the super-resolution process for the other one of the reflected light image ImR and the background light image ImL is performed using the alignment information to generate the high-resolution reflected light image IHR. As described above, according to the increase of the image quality by the super-resolution process, the detection data with a high-resolution can be obtained.

Further, in the present embodiment, the sub-pixel matching process is performed on the multiple background light images ImL, and the image quality of the reflected light image ImR is increased by the process for increasing the image quality using the alignment information. The background light image ImL containing the luminance information stores a state of texture of the surface of the object, for example. Accordingly, the background light image ImL is more suitable to secure the accuracy of the alignment information obtained by the sub-pixel matching compared with the reflected light image ImR. According to the super-resolution process using the alignment information obtained from the background light images ImL, the quality of the high-resolution reflected light image IHR can be higher compared with the super-resolution process using the reflected light images ImR.

Generally, in the detection data by the scanning type LiDAR, gaps between adjacent sensing points tend to be large, and it may be difficult to acquire dense detection data. In particular, in the direction orthogonal to the scanning direction, the gap between the sensing points is determined by the arrangement of the light source and the light receiving element 12a, and accordingly the resolution tends to be low.

In view of this point, the image processing ECU 30 of the present embodiment performs the sub-pixel matching process on the background light images ImL captured by the scanning type distance sensor 10 and calculates the correspondence between the images. Accordingly, the super-resolution process can be applied to the reflected light image ImR. As described above, since the process of increasing the resolution by software is applied to the detection data of the scanning type distance sensor 10 to which the process of increasing the resolution by hardware is hard to apply, the usefulness of the detection data can be improved.

In the present embodiment, the beam shape information indicating the spread shape of the light beam emitted by the light emitter 11 is used in the super-resolution process. Specifically, the beam shape information is used for generating the first comparative image ImE1 and the second comparative image ImE2 from the provisional high-resolution reflected light image IHR. That is, hardware information of the distance sensor 10 is effectively used for the super-resolution process. Accordingly, the super-resolution processing unit 44 can efficiently improve the accuracy of the high-resolution reflected light image IHR through the iterative operation.

Further, the matching processing unit 43 and the super-resolution processing unit 44 of the present embodiment change the contents of the sub-pixel matching process and the super-resolution process based on the vehicle information indicating the moving state of the vehicle A. Since the image processing ECU 30 has an upper limit in the processing capacity, the delay and the accuracy are trade-offs for each other when the provided information is based on the high-resolution reflected light image IHR. Accordingly, the image processing ECU 30 can appropriately adjust the the delay and the accuracy within the acceptable range based on the moving state by changing the contents of the process based on the moving state of the vehicle A.

The matching processing unit 43 and the super-resolution processing unit 44 are configured to suspend the sub-pixel matching process and the super-resolution process based on the vehicle information. Accordingly, the image processing ECU 30 can quickly provide the latest detection data detected by the distance sensor 10 to the automated driving ECU 50 when low latency is required, for example, in a scene where the vehicle A is traveling at high speed.

Further, the super-resolution processing unit 44 of the present embodiment is configured to change the number of iterations for the iterative operation of the super-resolution process based on the vehicle information. Further, the matching processing unit 43 and the super-resolution processing unit 44 of the present embodiment is configured to change the number of frames used for the sub-pixel matching process and the super-resolution process based on the vehicle information. According to this control, the image processing ECU 30 can provide highly accurate information based on the high-quality, high-resolution reflected light image IHR to the automated driving ECU 50 in a scene where the latency is acceptable to some extent, such as a case where the vehicle is traveling in an urban area. As a result, the automated driving ECU 50 can accurately recognize a small object such as pedestrians. In contrast, when the vehicle A is traveling at high speed, the image processing ECU 30 can balance the amount of delay and accuracy of the provided information. Accordingly, even when the processing capacity of the image processing ECU 30 is limited, the information for controlling the automated driving ECU 50 can be continuously provided.

In the above-described embodiment, the processing unit 31 corresponds to a processor, the image processing ECU 30 corresponds to an image processing device, and the sensor package 100 corresponds to an image processing system. The background light image ImL corresponds to a first image, the reflected light image ImR corresponds to a second image, the high-resolution reflected light image IHR corresponds to a high-resolution image, and the first comparative image ImE1 and the second comparative image ImE2 correspond to a comparative image. The vehicle A corresponds to a moving body, and the vehicle information corresponds to a moving body information.

OTHER EMBODIMENTS

Although the embodiments of the present disclosure have been described above, the present disclosure should not be understood as being limited to the aforementioned embodiments. The present disclosure can be applied to various embodiments and various combinations thereof, without departing from the spirits of the present disclosure.

In a first modification example of the above-described embodiment, the sub-pixel matching process is performed on the reflected light images ImR. The super-resolution processing unit 44 generates the high-resolution image of the background light image ImL (high-resolution background light image) by the super-resolution process using the alignment information obtained by the sub-pixel matching process performed on the reflected light image ImR. According to the first modification example, the quality of the background light image ImL captured in a dark place in which the change in the luminance is small can be increased using the alignment information extracted from the reflected light image ImR.

When the super-resolution process is performed on the background light image ImL as in the first modification, the super-resolution processing unit 44 does not use the above-described PSF in the down-conversion to generate the first comparative image and the second comparative image from the provisional high-resolution background light image. The super-resolution processing unit 44 generates, using another function different from the PSF, the first comparative image and the second comparative image in which the blur occurring when capturing the background light image ImL is reproduced.

In a second modification example of the above-described embodiment, the contents change in the super-resolution process based on the vehicle information is different. The image processing ECU 30 of the second modification performs one or two of suspending the super-resolution process, changing the number of iterations, and changing the number of frames used in the super-resolution process. The contents of the super-resolution process may not be changed based on the vehicle information. The vehicle information is not limited to the vehicle speed and may be changed as appropriate.

In a third modification example of the above-described embodiment, the distance sensor 10 is mounted on an autonomous robot for transporting materials used in warehouses, for example. As in the third modification example, the moving body on which the distance sensor 10 is mounted is not limited to the vehicle. The distance sensor 10 of a fourth modification example is mounted on a stationary structure that is a non-moving body and output the image data of the predetermined measurement range. Even in the above third and fourth modification examples, the image processing ECU 30 can achieve high resolution of the reflected light image ImR or the background light image ImL output from the distance sensor 10.

The distance sensor 10 of a fifth modification example of the above-described embodiment is a non-scanning type LiDAR device that does not include the movable optical member such as a polygon mirror. In such LiDAR device, the reflected light image ImR and the background light image ImL may be captured by a global shutter method. Further, the frame rates and the resolutions of the reflected light image ImR and the background light image ImL captured by the distance sensor 10 may be appropriately changed. Further, the resolution of the high-resolution reflected light image IHR generated by the super-resolution process may be appropriately changed.

In a sixth modification example of the above-described embodiment, the distance sensor 10 constitutes a sensor unit integrated with an external camera, for example. In a seventh modification example, the distance sensor 10 and the image processing ECU 30 may be integrated with each other to constitute a sensor package unit. Further, in an eighth modification example, the functions of the image processing ECU 30 and the automated driving ECU 50 are implemented on one integrated control ECU. In a ninth modification example, at least a part of the sub-pixel matching process or the super-resolution process is performed by a computer provided on a network. According to the ninth modification example, the high-resolution reflected light image IFR generated by the super-resolution process is provided to the automated driving ECU 50 of the vehicle A through the network.

In a tenth modification example of the above-described embodiment, multiple distance sensors 10 sequentially output the image data to the image processing ECU 30. The image processing ECU 30 is configured to perform the super-resolution process separately on each image data from the distance sensors 10. The measurement range of the distance sensor 10 is not limited to the front range of the vehicle A, but may be a side range or a rear range.

In an eleventh modification example of the above-described embodiment, autonomous sensors such as a camera device, a radar device, and a sonar device are electrically connected with the image processing ECU 30 in addition to the distance sensor 10. The output unit 45 of the image processing ECU 30 is configured to generate the information for recognizing the traveling environment by merging the high-resolution reflected light image IHR generated by the super-resolution processing unit 44 with the detection data of the autonomous sensors.

In the above-described embodiment, the respective functions provided by the image processing ECU 30 can be also provided by software and hardware for executing the software, only software, only hardware, and complex combinations of software and hardware. In cases where functions are provided by electronic circuits as hardware, the functions can be also provided by analog circuits or digital circuits which include a large number of logic circuits.

Further, the form of the storage medium (continuous tangible computer reading medium, non-transitory tangible storage medium) for storing an image processing program or the like that can realize the above image processing method may be changed as appropriate. For example, the storage medium is not limited to the configuration provided on the circuit board, and may be provided in the form of a memory card or the like. The storage medium may be inserted into a slot portion, and electrically connected to the control circuit of the image processing ECU 30. Further, the storage medium may be an optical disk or a hard disk as a copy base of the program of the image processing ECU 30.

The control unit and the method thereof which have been described in the present disclosure may be also implemented by a special purpose computer which includes a processor programmed to execute one or more functions implemented by computer programs. Alternatively, the apparatus and techniques described in this disclosure may be implemented by dedicated hardware logic. Alternatively, the device and the method described in the present disclosure may be implemented by one or more special purpose computers configured by a combination of a processor executing a computer program and one or more hardware logic circuits. The computer program may also be stored in a computer-readable non-transitory tangible storage medium as instructions to be executed by a computer.

What is claimed is:
1. An image processing device comprising:
    an image acquiring unit configured to acquire a reflected light image and a background light image in association with each other, the reflected light image containing distance information obtained by emitting light and detecting the light reflected from an object by a light receiving element, the background light image containing luminance information obtained by detecting background light relative to the light reflected from the object by the light receiving element;

a matching processing unit configured to
prepare a plurality of first images, each of the plurality of first images being one of the reflected light image and the background light image, and
perform a sub-pixel matching process on the plurality of first images; and a super-resolution processing unit configured to
prepare a plurality of second images, each of the plurality of second images being the other one of the reflected light image and the background light image and being associated with the each of the plurality of first images, and
perform a super-resolution process on the plurality of second images using alignment information acquired by the sub-pixel matching process to generate a high-resolution image.

2. The image processing device according to claim 1, wherein
the matching processing unit is configured to perform the sub-pixel matching process on a plurality of the background light images, and
the super-resolution processing unit is configured to perform the super-resolution process using the alignment information acquired by the sub-pixel matching process on the plurality of background light images to generate the high-resolution image of the reflected light image.

3. The image processing device according to claim 2, wherein
the super-resolution processing unit is configured to perform the super-resolution process using beam shape information indicating a spread shape of light beam detected as the reflected light by the light receiving element to generate the high-resolution image.

4. The image processing device according to claim 1, wherein
the each of the plurality of first images is the background light image, and
the each of the plurality of second images is the reflected light image.

5. The image processing device according to claim 1, wherein
the image acquiring unit is configured to acquire reflected light image and the background light image based on a detection by the light receiving element mounted in a moving body, and
the super-resolution processing unit is configured to change contents of the super-resolution process based on moving body information indicating a state of the moving body.

6. The image processing device according to claim 5, wherein
the moving body information contains information indicating a traveling speed of the moving body.

7. The image processing device according to claim 6, wherein
the super-resolution processing unit is configured to perform at least one of
suspending the super-resolution process when the traveling speed exceeds a threshold value,
increasing a number of iterations for an iterative operation of the super-resolution process with a decrease of the traveling speed, or
increasing a number of the plurality of first images used in the super-resolution process with the decrease of the traveling speed.

8. The image processing device according to claim 5, wherein
the super-resolution processing unit is configured to perform, based on the moving body information, at least one of
suspending the super-resolution process,
changing a number of iterations for an iterative operation of the super-resolution process, or
changing a number of the plurality of first images used in the super-resolution process.

9. The image processing device according to claim 1, wherein
the alignment information contains information indicative of a transformation amount for correcting a deviation for interposing the plurality of first images.

10. The image processing device according to claim 9, wherein
the super-resolution processing unit is configured to generate one of a plurality of comparative images used in the super-resolution process by applying the transformation amount acquired in the sub-pixel matching process.

11. An image processing method comprising:
acquiring a reflected light image and a background light image in association with each other, the reflected light image containing distance information obtained by emitting light and detecting the light reflected from an object by a light receiving element, the background light image containing luminance information obtained by detecting background light relative to the light reflected from the object by the light receiving element;
performing a sub-pixel matching process on a plurality of first images, each of the plurality of first images being one of the reflected light image and the background light image; and
performing a super-resolution process on a plurality of second images using alignment information acquired by the sub-pixel matching process to generate a high-resolution image, each of the plurality of second images being the other one of the reflected light image and the background image and being associated with the each of the plurality of first images.

12. At least one non-transitory computer readable medium storing a computer program comprising instructions configured to, when executed by at least one processor, cause the at least one processor to:
acquire a reflected light image and a background light image in association with each other, the reflected light image containing distance information obtained by emitting light and detecting the light reflected from an object by a light receiving element, the background light image containing luminance information obtained by detecting background light relative to the light reflected from the object by the light receiving element;
perform a sub-pixel matching process on a plurality of first images, each of the plurality of first images being one of the reflected light image and the background light image; and
perform a super-resolution process on a plurality of second images using alignment information acquired by the sub-pixel matching process to generate a high-resolution image, each of the plurality of second images being the other one of the reflected light image and the background image and being associated with the each of the plurality of first images.

13. An image processing system comprising:
a distance sensor configured to generate
- a reflected light image containing distance information obtained by emitting light and detecting the light reflected from an object by a light receiving element, and
- a background light image containing luminance information obtained by detecting background light relative to the light reflected from the object by the light receiving element;

a matching processing unit configured to
- prepare a plurality of first images, each of the plurality of first images being one of the reflected light image and the background light image, and
- perform a sub-pixel matching process on the plurality of first images; and a super-resolution processing unit configured to
- prepare a plurality of second images, each of the plurality of second images being the other one of the reflected light image and the background light image and being associated with the each of the plurality of first images, and
- perform a super-resolution process on the plurality of second images using alignment information acquired by the sub-pixel matching process to generate a high-resolution image.

* * * * *